3,714,072
PROCESS FOR THE PREPARATION OF CATALYSTS CONTAINING CRYSTALLINE ALUMINOSILICATE ZEOLITES
Hendrik Jan Maat, Uitgeest, and André Lucas Berg, Amsterdam, Netherlands, assignors to Kominklijke Zwavelzuurfabrieken voorheen Ketjen N.V., Amsterdam, Netherlands
No Drawing. Filed June 4, 1970, Ser. No. 43,587
Claims priority, application Netherlands, June 18, 1969, 6909263
Int. Cl. B01j 11/36, 11/40
U.S. Cl. 252—451                                              11 Claims

ABSTRACT OF THE DISCLOSURE

An aqueous suspension of a zeolite, which has had its alkali metal content reduced by at least one ion exchange reaction and has then been thermally treated, is combined with an aqueous alkaline alkali metal silicate solution, and silicon dioxide is gelled from the zeolite-containing solution by the addition of mineral acid, preferably to the silicate solution immediately before the combining of the latter with the zeolite suspension. The resulting zeolite-containing gel is combined with a solution or solutions of at least one compound of a metal from groups II–A, III–A and IV–A of the Periodic Table, and then hydrolyzed, whereupon the zeolite containing precipitate is washed and dried to provide a catalyst containing a crystalline aluminosilicate zeolite, silicon dioxide and an oxide of at least one metal from the mentioned groups of the Periodic Table.

---

This invention relates to a process for the preparation of catalysts containing crystalline aluminosilicate zeolites, by incorporating a crystalline aluminosilicate zeolite in a water-containing matrix material which contains silicon dioxide and an oxide of at least one metal of the groups II–A, III–A and/or IV–A of the Periodic Table of the elements, and drying the mixture.

A process of this kind is already described in U.S. Pat. No. 3,414,525 for the preparation of an aluminosilicate/silicon dioxide/aluminum oxide catalyst. In this process, a crystalline aluminosilicate, which has preferably not yet undergone base exchange, is dispersed in a silicon dioxide sol having a pH of approximately 4.0 to 4.5., which is set to a gel, whereupon the pH is increased to approximately 7.5 and the gel is left to age. The pH is then lowered again with acid to approximately 3.5 to 5.0, whereupon a soluble and separately prepared partially hydrolysed aluminum sulphate, in which two of the three sulphate radicals are replaced by hydroxyl radicals, is added to the acid zeolite-containing silicon dioxide gel. The resulting product is then subjected to aging at the mentioned acid pH, whereupon the pH is increased to 7 to complete the hydrolysis of the aluminum sulphate. The resulting hydrogel is then subjected to known further treatments, for example, it is filtered, washed out and spray-dried. Finally, base exchange takes place, for example, with solutions containing calcium, magnesium, rare earth metals and/or other metals. The foregoing complicated process was considered necessary in order to prevent the crystalline aluminosilicate zeolites from being subjected to too low a pH, that is, a pH below 3.5 to 4.0.

Accordingly, it is an object of this invention to provide a process whereby it is possible, in a very much simpler way, to prepare catalysts of the above-described type with excellent catalytic properties.

According to the present invention, a process for the preparation of a catalyst containing a crystalline aluminosilicate zeolite, silicon dioxide and an oxide of at least one metal from the groups I–A, III–A, and/or IV–A of the Periodic Table, comprises combining, with an aqueous alkaline alkali metal silicate solution, an aqueous suspension of a zeolite, which has had its alkali metal content reduced by at least one ion exchange reaction and has then been thermally treated, gelling silicon dioxide from the zeolite-containing solution by the addition of mineral acid, combining the resulting zeolite-containing gel with one or more solutions of compounds of at least one metal from groups II–A, III–A and/or IV–A of the Periodic Table, hydrolysing these compounds and then washing out and drying the total zeolite-containing precipitate. Although low pH values below 3.5 may occur during such process according to the invention, the zeolites used are in no way adversely affected thereby.

The catalysts obtained by the process according to the invention are distinguished by good activity and selectivity. These properties are important factors in assessing the quality of catalysts. They can be determined from the behavior of the catalyst when used for catalytic cracking under specific reaction conditions, with a specific petroleum fraction, for example, a mid-continent gas oil having a boiling range from 272–405° C.

With the process according to the invention it is possible to use a large number of natural or synthetic crystalline aluminosilicate zeolites, such as those of the X-type, Y-type, L-type, D-type, T-type, K-G-type and mordenite type.

In the process according to the invention synthetic crystalline zeolites of the faujasite type are preferably used. Examples of the latter zeolites are zeolite X (described in U.S. Pat. No. 2,882,244) and zeolite Y (described in U.S. Pat. No. 3,130,007). The compositions of these zeolites in their alkali metal form can be indicated as follows in terms of molar proportions of the oxides:

$M_2O$, $Al_2O_3$, $wSiO_2$, $yH_2O$, wherein M denotes an alkali metal atom. The sodium form of zeolite X has the formula: $(0.9\pm0.2)$ $Na_2O$, $Al_2O_3$, $(2.5\pm0.5)$ $SiO_2$, 0–8 $H_2O$; and the sodium form of zeolite Y has the following formula: $(0.9\pm0.2)$ $Na_2O$, $Al_2O_3$, $(3-6)$ $SiO_2$, 0–9 $H_2O$. These zeolites have uniform pore structure with openings having an effective diameter of about 6 to 15 A.

It is well known that, when aluminosilicates are to be used as cracking catalysts, it is desirable that the zeolites should have the minimum alkali metal content. A high alkali metal content undesirably reduces the thermal structural stability so that the effective life of the catalyst is adversely affected. This adverse effect of the alkali metal content is described, for example, in Dutch patent application 266989, wherein it is proposed to lower the alkali metal content by a base exchange process according to which the zeolites are repeatedly or continuously brought into contact with aqueous solutions of salts or other compounds in order to effect the exchange of the alkali metal ions in the aluminosilicate for the cations in the aqueous solution. In this way, alkali metal ions can be replaced by calcium, magnesium, hydrogen and/or precursors thereof, such as ammonium. It is also known, for example, as described in Dutch patent application 296167, that, in such a base exchange, the alkali metal ions can advantageously be replaced by ions of the rare earth metals. The presence of the latter ions improves the structural stability of the zeolite and gives it increased resistance to loss of crystallinity. In this base exchange method, the crystalline aluminosilicate is brought into contact with an aqueous solution of salts of rare earth metals (=RE), usually rare earth metal chlorides (=RECl₃), which predominantly comprise the chlorides of Ce, Eu, La, Nd, Pr, Sm and Gd, and also Y-chloride, or with an aqueous solution of didymium chloride (a mixture of rare earth metal chlorides having a low Ce content). These aqueous solutions may also contain hydrogen ions and/or ammonium so that some of the alkali metal ions in the zeolite are replaced by hydrogen and/or ammonium, with ammonium being a hydrogen precursor, that is, it can be converted to hydrogen by an after-treatment, for example, by heating. The zeolite can also be subjected to base exchange by first treating it with an aqueous solution of rare earth metal salts, and then with a solution containing hydrogen and/or ammonium ions.

An important aspect of the process according to the invention is that an aqueous suspension of a zeolite which has been exchanged at least once and then thermally treated is combined with an aqueous alkaline alkali metal silicate containing solution. To obtain an optimum result, it is advisable to avoid using a zeolite in dry form and/or a zeolite which has not yet been exchanged at least once. Preferably, the zeolite used has been exchanged only once for rare earth metals and then thermally treated, thus reducing to a minimum the expensive time-consuming base exchanging steps.

The thermal treatment of the zeolite comprises heating the zeolite after the exchange in an inert medium, such as air, at 120 to 900° C., preferably 400 to 700° C.

If required, the content of alkaline-earth metals and/or rare earth metals in the end product can be increased by incorporating dissolved salts of alkaline-earth metals and/or rare earth metals in the aqueous suspension of the feed zeolite which has been exchanged at least once, and if required such salts and the feed zeolite can be left in contact with one another for some time under exchange conditions.

In a very advantageous embodiment of the present process, gelling of the silicon dioxide from the alkali metal silicate solution is carried out in two stages, during the first of which, part of the mineral acid is added to part of the silicate solution, gelling is allowed to occur and then, during the second stage, the rest of the acid and then the rest of the alkali metal silicate solution is added to the reaction mixture of the first stage.

In both this two-stage process and the process in which the mineral acid is added in one stage, it is preferable to combine the aqueous zeolite suspension with the alkali metal silicate solution after mineral acid has been added to the silicate solution and before silicon dioxide has gelled from this solution.

In the above-described two-stage process, it is customary during the first stage to add an amount of the total quantity of mineral acid required, for example, sulphuric acid, such that the pH is finally approximately 10. Gelling starts after some time, for example, after 1 to 8 minutes. Just before gelling starts it is preferable then to add the suspension of zeolite which has been exchanged at least once. After gelling, the gel is broken by stirring, whereupon the remainder of the acid is added (the pH drops to about 8½ to 8) followed by the rest of the alkali metal silicate solution (pH again rises to approximately 10). The primary silicon dioxide gel particles formed after the first acid addition grow in the second stage during ripening and the result of this two-stage process is finally a silicon dioxide gel having a higher $SiO_2$ content than in the case of a one-stage process, while filterability is not impaired as a result. The silicon dioxide gel paste can consequently be washed out very easily to liberate alkali metal and mineral acid residual ions. A relatively small quantity of washing liquid is required for this purpose. The alkali metal ions still present in the aluminosilicate zeolites which have been exchanged at least once can also be removed easily during the washing out process. Furthermore, the result of the higher silicon dioxide content is that a smaller quantity of heat is required for drying.

The resulting zeolite-containing silicon dioxide gel is combined with one or more solutions of compounds of at least one metal from the groups II–A, III–A and/or IV–A of the Periodic System of Elements, which are hydrolysed. In this way it is possible to obtain a gel-like product, hereinafter referred to as a co-gel for the sake of convenience, of silicon dioxide and an oxide of at least one metal of the groups II–A, III–A and/or IV–A. Suitable co-gels are, for example, silicon dioxide/beryllium oxide, silicon dioxide/magnesium oxide, silicon dioxide/aluminum oxide, silicon dioxide/thorium oxide, silicon dioxide/titanium dioxide gels and ternary combinations, such as silicon dioxide/aluminum oxide/thorium oxide, silicon dioxide/aluminum oxide/zirconium oxide, silicon dioxide/aluminum dioxide/magnesium oxide and silicon dioxide/magnesium oxide/zirconium oxide gels. Co-gels of silicon dioxide and aluminum oxides are preferred. In the above gels, the silicon dioxide is usually the main constituent and its content is usually 55 to 99%, by weight, while the metal oxide content varies from 1 to 45%, by weight.

The zeolite-containing co-gel is washed out until a low-alkali metal content is obtained, for example, less than 0.1%, by weight, based on the dry end product.

In the case of the silicon dioxide/aluminum oxide/zeolite catalyst preferably prepared according to the invention, the zeolite-containing silicon dioxide gel is combined with one or more solutions of aluminum compounds, the same are hydrolyzed, and the total zeolite-containing precipitate is washed out until an alkali metal content of less than 0.1%, by weight, is obtained, based on dry end product. In a very attractive embodiment of this process, solutions of aluminum sulphate and sodium aluminate are used successively as the aluminum compound solution. Although the pH of the total reaction medium may drop below 3.5 when aluminum sulphate solution is added to the zeolite-containing silicon dioxide gel, and this is stated to be undesirable in U.S. Patent No. 3,414,525, the end product obtained according to the present invention nevertheless has excellent catalytic properties.

After the washing out process, the total zeolite-containing precipitate is dried, preferably at temperatures from 105 to 600° C. Drying can be carried out in any known manner, but it is preferable to use spray-drying.

The resulting catalytically active material can be used for conversion reactions, for example, the catalytic cracking of hydrocarbons, either in the form of a powder or in the form of shaped catalyst particles, such as granules, pills, tablets and other shaped elements prepared in known ways from the end product obtained by the process according to the invention.

The invention will be further explained with reference to the following illustrative examples:

EXAMPLE 1

1277 g. of a synthetic zeolite of the faujasite type, namely Y-type (having a loss on ignition of 4.4%, by weight at 1,000° C.), which had been exchanged twice for rare earth metals and then thermally treated, and which contained 56.1% $SiO_2$, 18.1% $Al_2O_3$, 0.86% $Na_2O$ and 22.6% $RE_2O_3$, calculated by weight on the basis of dry substances, was suspended in that form, that is, in the dry state, in one portion (approximately 8 liters) of a prepared alkaline mixture of 172 kg. of decationised water (hereinafter referred to as H-water) and 50 kg. of an aqueous sodium silicate solution containing 27%, by weight, of $SiO_2$ and 8%, by weight, $Na_2O$. The resulting mixture of faujasite, water glass and water was homogenized in a colloid mill and then introduced into a reactor along with the remainder of the prepared alkaline mixture. The reactor, which had a capacity of 1 cubic meter and was provided with a steam-heated double jacket and a turbine agitator with stator, was then heated to 28° C., whereafter 15.5 kg. of 25% sulphuric acid was introduced over a period of 6 minutes. Under these conditions the temperature rose to about 31° C. Within one minute from the completion of the acid introduction, gelling occured, the temperature rising further to 32.5° C. The gel was then broken for 3 minutes by operation of the agitator, and then 5.6 kg. of 25% sulphuric acid were introduced for 8 minutes until the pH was 7.1, and this was followed directly by the addition for half a minute of 14.0 kg. of the above-mentioned sodium silicate solution. By reason of the foregoing the pH rose to 9.9 and the temperature to 33° C.

The resulting gel was allowed to ripen for 6 minutes with the agitator stationary and was then transferred to a 500 liter reactor provided with a slow-rotating rake agitator. An aqueous solution of 18.0 kg. of aluminum sulphate containing 8% by weight of $Al_2O_3$, was then added over a period of half a minute (pH became 3.9), and then an aqueous solution of 4.0 kg. of sodium aluminate containing 28% by weight of $Al_2O_3$ was introduced over a period of 15 minutes, the pH rising to 4.7.

The suspension was then drained on a filter having an area of 3.8 m.², and then washed twice each time with 200 liters of H-water at a temperature of 45° C. The cake was then agitated in 100 liters of H-water, drained again on the filter, washed twice, each time with 150 liters of H-water at a temperature of 45° C., and then agitated again in 100 liters of H-water. The pH was then increased from 4.1 to 5.5 by means of ammonia, whereupon the suspension was drained on the filter and washed twice, each time with 350 liters of H-water at a temperature of 45° C., to remove sulphate ions.

The washed-out cake was agitated with 112 liters of H-water, giving a suspension having a solids content of about 7%, by weight, which was brought to a pH of 7 with ammonia, and then homogenized by means of a colloid mill and finally spray-dried. The inlet and exit temperatures of the spray-dryer were respectively 420 and 160° C.

Activity and selectivity tests

Before the activity and selectivity were determined, the catalyst resulting from the above described process was steam conditioned by heating for 17 hours in a steam atmosphere at 750° C. 10 to 30 g. of the sample were then placed in a reaction column between two layers of inert material consisting of quartz grains. The reactor was heated to 500° C. The test itself comprises nine cycles, each cycle consisting of the following five stages:

(1) (Duration 8 minutes): Nitrogen was fed through the reaction column, through a collector vessel connected to the bottom of the column, and through the connecting conduits.

(2) (Duration 3 minutes): The feed oil, a Mid-Continent gas oil (specific gravity 0.866 g. per cc.; boiling range 272–405° C.) was introduced at the top of the column at a feed rate of 25–40 ml. per hour. Under these conditions, the nitrogen was displaced from the reactor by the resulting gaseous products. The resulting products were carried off.

(3) (Duration 10 minutes): The feeding of the oil to the column continued at the same feed rate as in stage 2, and the reaction products were collected in the collector vessel, which was cooled to 0° C. The non-condensed reaction products were collected in a gas bottle above an aqueous common salt solution.

(4) (Duration 24 minutes): Nitrogen was passed through the column at a rate of 6 liters per hour, and the reaction products still present in the column were carried off.

(5) (Duration 55 minutes): Air was introduced to the column at a rate of 20 liters per hour. Under these conditions the catalyst was regenerated, the coke deposited thereon during the reaction being burnt. The resulting water and $CO_2$ were collected in pre-weighed U-tubes respectively filled with $MgClO_4$ and sodium carbonate-asbestos. (Any CO forming was first converted to $CO_2$ by passing the gases over CuO at 800° C.). The amount of coke formed during the reaction was determined from the increase in the weight of the U-tubes.

The reaction products collected in the collector vessel during stage 3 of 9 cycles were divided into the following 3 fractions by distillation:

(a) A gas fraction, consisting of components having a boiling point below 35° C., and which was added to the gas already collected in the gas bottles.

(b) A gasoline fraction consisting of components having a boiling point below 205° C.

(c) A residue consisting of components having a boiling point above 205° C.

The activity and selectivity of the catalyst samples were compared to those of an amorphous standard catalyst having an $Al_2O_3$ content of 13% and which had also been steam conditioned by heating for 17 hours at 750° C. in a steam atmosphere prior to being subjected to nine cycles of the above described test. The activity is defined as follows:

$$\text{activity} = \frac{\text{WHSV through the catalyst sample}}{\text{WHSV through the standard catalyst}} \times 100$$

for equal conversion.

The conversion occurring during cracking is defined as follows:

Conversion percent $$= \frac{(\text{weight of feed}) - (\text{weight of all fractions having B.P. above 240° C.})}{(\text{weight of feed})} \times 100$$

The term WHSV appearing in the above equation for activity is defined as follows:

$$\text{WHSV} = \frac{\text{weight of oil, feed per hour}}{\text{weight of catalyst sample}}$$

The selectivity is expressed as the gasoline factor, the gas factor and the coke factor, which are defined as follows:

$$\text{gasoline factor} = \frac{\text{gasoline yield through the sample}}{\text{gasoline yield through the standard}}$$

for equal conversion.

$$\text{gas factor} = \frac{\text{gas production through the sample}}{\text{gas production through the standard}}$$

for equal conversion.

$$\text{coke factor} = \frac{\text{coke production through the sample}}{\text{coke production through the standard}}$$

for equal conversion.

The activity and selectivity defined, as above, were determined for the catalyst resulting from the process of Example 1 and are given in Table A below. This table also indicates the percentage by weight of faujasite in the prepared catalyst, based on the starting material, and the $RE_2O_3$ and $Na_2O$ contents of the end product.

EXAMPLE 2

1290 g. of a faujasite of the Y-type (having a loss on ignition of 5.3% by weight at 1,000° C.) which had been exchanged once for rare earth metals and then thermally treated and which contained 59.2% $SiO_2$, 18.9% $Al_2O_3$, 3.63% $Na_2O$ and 17.0% $RE_2O_3$, by weight, based on dry substance, was suspended, in the same way, that is, in the dry state, as described in Example 1 in one part (approximately 8 liters) of a prepared alkaline mixture of 172 kg. H-water and 50 kg. of an aqueous sodium silicate solution containing 27%, by weight, of $SiO_2$ and 8%, by weight, of $Na_2O$.

In the same way as described in Example 1, a catalyst was also prepared from the resulting mixture, and its activity and selectivity were determined in the same way as indicated in Example 1. The results are shown in Table A.

EXAMPLE 3

1290 g. of a faujasite of the Y-type having the same composition as the faujasite used in Example 2, and which was exchanged once for rare earth metals and then thermally treated, was suspended in 8 liters of dunes water, homogenized, and then added to a prepared alkaline mixture of 164 kg. of H-water and 50 kg. of the sodium silicate solution described in the previous examples. The remaining steps in the preparation of a catalyst were the same as described in the previous examples and its activity and selectivity were similarly determined. The results are given in Table A.

It is quite clear from the results of these tests, that a catalyst with better activity is obtained with the process according to the invention when an aqueous suspension of the zeolite is combined with the alkaline alkali metal silicate solution, as in Example 3, than when the zeolite is combined in the dry state with the alkaline alkali metal silicate solution, as in Examples 1 and 2.

EXAMPLE 4

15.5 kg. of 25% sulphuric acid were added over a period of 6 minutes to a mixture of 172 kg. of H-water and 50 kg. of the aqueous sodium silicate solution described in Example 1 and having a temperature of 28° C. Directly after the addition of the acid, there was added a prepared suspension homogenized in a colloid mill, comprising 1290 g. of a faujasite of the Y-type in 8 liters of dunes water, the faujasite having the same composition as the faujasite used in Examples 2 and 3, and which had been exchanged once for rare earth metals and then thermally treated. After the addition of the faujasite suspension, gelling occurred within one minute after completion of the acid addition, the temperature rising to 34.5° C. The gel was then broken for 3 minutes by operation of the agitator, whereupon 6.0 kg. of 25% sulphuric acid were added for a period of 8 minutes to give a pH of 7.1, followed directly by the addition for half a minute of 14.0 kg. of aqueous sodium silicate solution having a composition as described in Example 1. The pH rose to 9.9 and the temperature to 36.5° C. under these conditions. The subsequent catalyst preparation and the determination of the activity and selectivity of the resulting end product were similar to that described in Example 1. The results are given in Table A.

From these results it is apparent that the activity of the catalyst resulting from the process according to the invention is even better when the acid is added to the silicate solution which is then combined with the aqueous zeolite suspension before silicon dioxide has gelled from the silicate solution, than when the acid is added only after the combining of the zeolite suspension with the silicate solution, as in Example 3.

EXAMPLE 5

A catalyst having a higher $RE_2O_3$ content was prepared and tested in the same way as in Example 4, but starting with 2354 g. of the same faujasite of the Y-type which had been exchanged once for rare earth metals and then thermally treated. The results are given in the Table A.

EXAMPLE 6 (COMPARATIVE EXAMPLE ACCORDING TO PRIOR ART)

For comparison purposes, a catalyst was prepared having the same $RE_2O_3$ content as in Example 5, but by using the complicated process of United States Patent No. 3,414,525. Such preparation was carried out as follows:

10.2 liters of aqueous sodium silicate solution having the composition described in the previous examples in 30 kg. of deionised water was added with agitation at a temperature of 38° C. to 4.7 liters of 25% sulphuric acid, the pH of the total mixture finally being 4.2. 503 g. of a faujasite of the Y-type which had not yet been exchanged for rare earth metals were then added. This faujasite, having a loss on ignition of 20% by weight at 1,000° C., had the following composition (based on dry substance): 63.6%, by weight, of $SiO_2$, 23.8%, by weight, of $Al_2O_3$ and 12.5%, by weight, of $Na_2O$. Gelling occurred after 4 minutes, and agitation was continued for 20 minutes. The pH was adjusted to 7.5 with ammonia. The paste was aged at 38° C. for one hour. The pH was then adjusted to 5.0 with approximately 300 ml. of 25% $H_2SO_4$. A partially hydrolysed solution of aluminum sulphate was then added to the agitated paste, the pH becoming 4.2. The paste was aged for one hour. The partially hydrolysed aluminum sulphate solution was prepared by introducing ammonia into a very well agitated reactor containing 10.8 liters of aqueous 8% aluminum sulphate solution, to give a pH of 4.0, aging being continued for one hour thereafter.

The above paste was then adjusted to pH 7 by means of ammonia to complete the hydrolysis of the aluminum sulphate. The paste was filtered, the cake was agitated in water to give approximately 7%, by weight, of solids, and then spray-dried.

The spray-dried material was then washed with an ammoniacal ammonium chloride solution until the filtrate was free from sulphate ions, and then the filter cake was dried at 190° C. for 5 hours.

510 g. of the material dried in this way was added to an aqueous solution of 109 g. of rare earth metal chloride (equivalent to 28%, by weight, of $RE_2O_3$) in 1.5 liters of demineralized water and then agitated for 2 hours.

The suspension was filtered and washed with demineralized water until no sodium or chloride ions could be detected in the filtrate. The filter cake was then dried for 5 hours at 200° C. and finally calcined for 2 hours at 315° C. Before determining its selectivity and activity, the resulting catalyst was heated for 17 hours in a steam atmosphere at 750° C. and subsequently treated and tested as in Example 1. The results are shown in Table A. From this comparative example, it will be apparent that the use of the process according to the invention (Example 5) gives a catalyst having a much higher activity than that prepared by the very complicated known process.

EXAMPLE 7

In the same way as described in Example 4, a catalyst was prepared from 2282 g. of a faujasite of the X-type which had been exchanged once for rare earth metals and then thermally treated. This faujasite, having a loss on ignition of 3.4%, by weight, at 1,000° C., had the following composition in percent, by weight, based on dry substance: 39.6% of $SiO_2$, 27.7% of $Al_2O_3$, 2.66% of $Na_2O$ and 27.6% of $RE_2O_3$. The catalyst activity and selectivity were determined in the manner described in the preceding examples, except that the steaming temperature for both the catalyst under examination and the standard catalyst was 700° C. The results obtained are shown in Table A.

EXAMPLE 8

16.5 kg. of 25% sulphuric acid were added for 6 minutes to a mixture heated to 20° C. and comprising 203 kg. of H-water and 50 kg. of the aqueous sodium silicate solution described in Example 1. Directly after completion of the addition of acid, there was added a previously prepared suspension, homogenized in a colloid mill, comprising 1507 g. of a Y-type faujasite (with the composition as indicated in Example 4) which had been exchanged once for rare earth metals and then thermally treated, in 8 liters of dunes water.

Gelling occurred within 1½ minutes after completion of the addition of the acid, the temperature rising to 24° C. The gel was then broken for 3½ minutes by operation of the agitator, and then 5.6 kg. of 25% sulphuric acid were added over a period of 8 minutes to give a pH of 7.1, followed directly by the addition, for half a minute, of 14.0 kg. of the previously-mentioned sodium silicate solution, the pH again rising to 9.9 and the temperature to 27° C.

The resulting gel was ripened for 5 minutes with the agitator stationary and then left in a 500 liter reactor having a slow-rotating rake agitator. An aqueous solution of 36.5 kg. of aluminum sulphate containing 8%, by weight, of $Al_2O_3$ was added to this over a period of half a minute. The pH was then 3.8. 10.9 kg. of a solution of sodium aluminate containing 28%, by weight, of $Al_2O_3$ was then added over a period of 15 minutes, the pH rising to 4.6.

The suspension was then placed on a filter and further processed as described in Example 1. Determination of the activity and selectivity of the prepared catalyst gave the results shown in Table A below.

TABLE A

| Example | Percent by weight of faujasite | Activity | Selectivity | | | Percent by weight | |
| | | | Gas factor | Gasoline factor | Coke factor | $RE_2O_3$ | $Na_2O$ |
| --- | --- | --- | --- | --- | --- | --- | --- |
| 1 | 5.8 | 345 | 0.85 | 1.14 | 0.70 | 1.20 | 0.03 |
| 2 | 5.8 | 358 | 0.84 | 1.20 | 0.71 | 0.87 | 0.05 |
| 3 | 5.8 | 386 | 0.78 | 1.19 | 0.69 | 0.94 | 0.04 |
| 4 | 5.8 | 444 | 0.74 | 1.21 | 0.71 | 0.95 | 0.03 |
| 5 | 10.1 | 630 | 0.67 | 1.32 | 0.40 | 1.59 | 0.04 |
| 6 (prior art) | 10.1 | 490 | 0.69 | 1.31 | 0.37 | 2.73 | 0.08 |
| 7 | 10 | 425 | 0.88 | 1.11 | 0.90 | 2.58 | 0.04 |
| 8 | 5.8 | 464 | 0.8 | 1.16 | 0.6 | 0.92 | 0.05 |

What is claimed is:

1. A process for producing a catalyst containing a crystalline aluminosilicate zeolite, comprising ion exchanging a crystalline aluminosilicate zeolite at least once to reduce its alkali metal content, thermally treating the ion exchanged zeolite to dry the latter, mixing water with said crystalline aluminosilicate zeolite which has had its alkali metal content reduced and has then been thermally treated so as to form an aqueous suspension of said zeolite, combining only said aqueous zeolite suspension with an aqueous alkaline alkali metal silicate solution which is substantially free of precipitated silica gel, gelling silicon dioxide from the zeolite-containing alkali metal silicate solution by the addition of mineral acid, combining the resulting zeolite-containing silicon dioxide gel with at least one solution of a compound of at least one metal selected from the class consisting of groups II-A, III-A and IV-A of the Periodic Table, hydrolyzing the resulting suspension, and then washing out and drying the precipitate that results from such hydrolysis to provide a catalyst which contains said crystalline aluminosilicate zeolite in a matrix of silicon dioxide and an oxide of said at least one metal selected from groups II-A, III-A and IV-A of the Periodic Table.

2. A process according to claim 1, in which said crystalline aluminosilicate zeolite is of the faujasite type.

3. A process according to claim 2, in which said crystalline aluminosilicate zeolite is selected from zeolites of the X and Y types.

4. A process according to claim 1, in which said crystalline aluminosilicate zeolite has had its alkali metal content reduced by a single ion exchange reaction exchanging its alkali metal ions with rare earth metal ions.

5. A process according to claim 1, in which said gelling of silicon dioxide from said zeolite-containing alkali metal silicate solution is effected in two stages, in the first stage of which a part of said mineral acid is added to a part of said silicate solution and gelling is allowed to occur, and in the second stage of which the remainder of said mineral acid and the remainder of said silicate solution are added to the reaction product of said first stage and further gelling is allowed to occur.

6. A process according to claim 5, in which said part of the mineral acid is added to said part of the silicate solution prior to combining of the latter with said aqueous zeolite suspension, and said zeolite suspension is combined with said silicate solution having acid added thereto before the commencement of the gelling of silicon dioxide from said silicate solution.

7. A process according to claim 1, in which said mineral acid is added to said silicate solution prior to the combining of the latter with said aqueous zeolite suspension and said combining is effected before the commencement of the gelling of silicon dioxide from said silicate solution.

8. A process according to claim 1, in which said metal selected from the class consisting of groups II-A, III-A and IV-A of the Periodic Table is aluminum.

9. A process according to claim 8, in which said washing out of said precipitate is continued until the alkali metal content thereof is reduced to a maximum of 0.1%, based on the weight of the dry product.

10. A process according to claim 9, in which said resulting zeolite-containing silicon dioxide gel is combined with solutions of aluminum sulphate and sodium aluminate in succession.

11. A catalyst containing a crystalline aluminosilicate zeolite, silicon dioxide and an oxide of at least one metal selected from groups II-A, III-A and IV-A of the Periodic Table and which is prepared by the process of claim 1.

References Cited

UNITED STATES PATENTS

| 3,558,476 | 1/1971 | Robbins, Jr. et al. | 252—455 X |
| 3,414,525 | 12/1968 | Michalko | 252—453 |
| 3,346,512 | 10/1967 | Gladrow et al. | 252—455 |
| 3,410,808 | 11/1968 | Smith et al. | 252—453 |

CARL F. DEES, Primary Examiner

U.S. Cl. X.R.

252—455 Z